(12) United States Patent
Haller

(10) Patent No.: US 10,919,417 B2
(45) Date of Patent: Feb. 16, 2021

(54) VEHICLE SEAT COMPRISING MUTUALLY ADJUSTABLE SWITCHING CONSOLES

(71) Applicant: GRAMMER AG, Amberg (DE)

(72) Inventor: Thomas Haller, Ursensollen (DE)

(73) Assignee: GRAMMER AG, Amberg (DE)

( * ) Notice: Subject to any disclaimer, the term of this patent is extended or adjusted under 35 U.S.C. 154(b) by 28 days.

(21) Appl. No.: 16/382,419

(22) Filed: Apr. 12, 2019

(65) Prior Publication Data
US 2019/0316322 A1 Oct. 17, 2019

(30) Foreign Application Priority Data

Apr. 13, 2018 (DE) .......................... 10 2018 108 792
Apr. 13, 2018 (DE) .......................... 10 2018 108 795

(51) Int. Cl.
*A47C 7/62* (2006.01)
*B60N 2/20* (2006.01)
(Continued)

(52) U.S. Cl.
CPC .............. *B60N 2/20* (2013.01); *B60N 2/0228* (2013.01); *B60N 2/06* (2013.01); *B60N 2/22* (2013.01);
(Continued)

(58) Field of Classification Search
CPC .... B60N 2/1817; B60N 2/181; B60N 2/1814; B60N 2/20; B60N 2/773; B60N 2/0228;
(Continued)

(56) References Cited

U.S. PATENT DOCUMENTS

| 4,478,308 A | * | 10/1984 | Klaassen | ................ B60K 26/00 180/326 |
| 8,079,438 B2 | * | 12/2011 | Kim | ........................ B60N 2/38 180/326 |

(Continued)

FOREIGN PATENT DOCUMENTS

| CA | 2297997 | 8/2001 |
| DE | 19746438 | 4/1999 |

(Continued)

OTHER PUBLICATIONS

Official Action for German Patent Application No. 102018108792.6, dated Nov. 22, 2018, 2 pages.
(Continued)

*Primary Examiner* — Chi Q Nguyen
(74) *Attorney, Agent, or Firm* — Sheridan Ross P.C.

(57) ABSTRACT

The invention relates to a vehicle seat for a vehicle, comprising a seat part that has a seat part frame, comprising a backrest part and comprising a first and a second switching console element which each comprise at least one control element for actuating at least one function of an actuator element of the vehicle, the first switching console element being arranged on a first side of the seat part and the second switching console element being arranged on a second side of the seat part so as to extend in the longitudinal direction of the vehicle seat, the seat part and/or the backrest part being designed so as to be adjustable with respect to a degree of inclination, it being possible to change a relative position of a first portion of the first switching console element, with respect to the vehicle seat, it being possible to transfer the change in the relative position of the first portion of the first switching console element into a change in a relative position of a first portion of the second switching console
(Continued)

element, with respect to the vehicle seat, by means of a transmission system which is free of electronic components.

13 Claims, 9 Drawing Sheets

(51) Int. Cl.
*B60N 2/02* (2006.01)
*B60N 2/06* (2006.01)
*B60N 2/22* (2006.01)
*B60N 2/68* (2006.01)
*B60N 2/90* (2018.01)
*E02F 9/16* (2006.01)
*E02F 9/20* (2006.01)
*F15B 11/16* (2006.01)
*F16C 1/10* (2006.01)

(52) U.S. Cl.
CPC ............... *B60N 2/68* (2013.01); *B60N 2/90* (2018.02); *E02F 9/166* (2013.01); *E02F 9/2004* (2013.01); *F15B 11/16* (2013.01); *F16C 1/10* (2013.01); *F15B 2211/7051* (2013.01); *F15B 2211/71* (2013.01)

(58) Field of Classification Search
CPC ... B60N 2/68; B60N 2/10; B60N 2/06; B60N 2/062; B60N 2/22; B60N 2/24; B60N 2/04; B60N 2/797; B60N 2/38; B60N 2/3052; B60N 2/305; B60N 2/90; B60N 2/3045; B60N 2002/0208; F15B 11/16; F15B 2211/71; F15B 2211/7051; E02F 9/166; E02F 9/2004; F16C 1/10; F16C 1/106
USPC ........ 297/217.3, 411.35, 411.38, 463.1, 331, 297/334, 344.21, 344.1
See application file for complete search history.

(56) References Cited

U.S. PATENT DOCUMENTS

| | | | | |
|---|---|---|---|---|
| 9,592,758 | B2* | 3/2017 | Mahler | .................. B60N 2/797 |
| 10,702,069 | B2* | 7/2020 | Pelka | ...................... B60N 2/10 |
| 2003/0230447 | A1* | 12/2003 | Wulfert | .................. B60R 11/02 |
| | | | | 180/329 |
| 2006/0042857 | A1* | 3/2006 | Catton | ..................... B60N 2/77 |
| | | | | 180/334 |
| 2006/0061177 | A1* | 3/2006 | Billger | ................. B60N 2/0228 |
| | | | | 297/344.21 |
| 2009/0085392 | A1 | 4/2009 | Lucas et al. | |
| 2011/0127819 | A1* | 6/2011 | Wada | ..................... E02F 9/166 |
| | | | | 297/344.1 |
| 2011/0236131 | A1* | 9/2011 | Heindtel | ................ E01C 19/48 |
| | | | | 404/83 |
| 2014/0339869 | A1* | 11/2014 | Ott | ....................... B60N 2/0232 |
| | | | | 297/293 |
| 2017/0203673 | A1* | 7/2017 | Parker | ..................... B60N 2/39 |
| 2017/0308074 | A1* | 10/2017 | Kandula | ............... E02F 9/2004 |

FOREIGN PATENT DOCUMENTS

| | | |
|---|---|---|
| DE | 19933429 | 1/2001 |
| DE | 102005022838 | 1/2006 |
| DE | 102010014348 | 10/2011 |
| DE | 102015106386 | 5/2016 |
| EP | 0086523 | 8/1983 |

OTHER PUBLICATIONS

Official Action for German Patent Application No. 102018108795.0, dated Jan. 14, 2019, 3 pages.
Extended Search Report for European Patent Application No. 19165067.0, dated Sep. 11, 2019, 5 pages.

* cited by examiner

VEHICLE SEAT COMPRISING MUTUALLY ADJUSTABLE SWITCHING CONSOLES

CROSS-REFERENCE TO RELATED APPLICATIONS

This application claims the benefit of German Patent Application No. DE 10 2018 108 792.6 filed Apr. 13, 2018 and German Patent Application No. DE 10 2018 108 795.0 filed Apr. 13, 2018, the entire disclosures of each of which are incorporated herein by reference.

FIELD

The invention relates to a vehicle seat for a vehicle, comprising a seat part that has a seat part frame, comprising a backrest part and comprising a first and a second switching console element which each comprise at least one control element for actuating at least one function of an actuator element of the vehicle, the first switching console element being arranged on a first side of the seat part and the second switching console element being arranged on a second side of the seat part so as to extend in the longitudinal direction of the vehicle seat, the seat part and/or the backrest part being designed so as to be adjustable with respect to a degree of inclination, characterised in that a relative position of a first portion of the first switching console element with respect to the vehicle seat can be changed, it being possible to transfer the change in the relative position of the first portion of the first switching console element into a change in a relative position of a first portion of the second switching console element, with respect to the vehicle seat, by means of a transmission system (10) which is free of electronic components.

BACKGROUND

Vehicle seats of this kind generally comprise a seat part having a seat part frame and a backrest part.

Furthermore, vehicle seats of this kind comprise at least one, preferably two, switching console elements, one of the switching console elements being arranged on a left-hand side, and one being arranged on a right-hand side, of the seat part. A switching console element of this kind comprises at least one control element for actuating at least one function of at least one actuator element of the vehicle. The control element is designed for example as a hand lever or joystick. For example, the control element actuates a movement of an excavator shovel of a vehicle designed as an excavator, or the fork of a vehicle designed as a forklift truck.

In order to be able to meet the requirements of different drivers having different physiques, the seat part and/or the backrest part is often designed so as to be adjustable with respect to a degree of inclination. In addition, it is often also possible to adjust at least the seat part, in the longitudinal direction of the vehicle seat.

If the vehicle seat comprises two switching console elements, both said elements often have to be adapted separately to the respective requirements.

SUMMARY

The object of the present invention is therefore that of providing a vehicle seat in which the two switching console elements can be adjusted in a manner combined with one another at least in portions, in order to be easily accessible for all potential drivers and in all conceivable positions or degrees of inclination of the backrest part and of the seat part.

The object of the invention is achieved by a vehicle seat for a vehicle, comprising a seat part that has a seat part frame, comprising a backrest part and comprising a first and a second switching console element which each comprise at least one control element for actuating at least one function of an actuator element of the vehicle, the first switching console element being arranged on a first side of the seat part and the second switching console element being arranged on a second side of the seat part so as to extend in the longitudinal direction of the vehicle seat, the seat part and/or the backrest part being designed so as to be adjustable with respect to a degree of inclination, it being possible for a relative position of a first portion of the first switching console element, with respect to the vehicle seat, to be changed, it being possible for the change in the relative position of the first portion of the first switching console element to be transferred into a change in a relative position of a first portion of the second switching console element, with respect to the vehicle seat, by means of a transmission system which is free of electronic components.

Within the meaning of the present invention, the expression "free of electronic components" is intended to be understood to mean that the relevant element, in this case the transmission system, is designed without any components that a person skilled in the art would consider to be electronic components; in particular, electronic components of this kind are designed for example as sensors, contacts, controllers, switches, relays, diodes, light barriers, etc.

It is advantageous if it is possible for the change in the relative position of the first portion of the first switching console element, with respect to the vehicle seat, to be made in the longitudinal direction of the vehicle seat. It is thus possible, for example, for at least the first switching console element, and thus the control lever element associated therewith, to be shifted forwards or backwards and to be set to the physique or the arm length of different drivers. It is also conceivable, however, that it is possible for the change in the relative position of the first portion of the first switching console element, with respect to the vehicle seat, to be made in the height or width direction of the vehicle seat. It is also conceivable that it is possible for the change in the relative position of the first portion of the first switching console element, with respect to the vehicle seat, to be made in such a way that a vector of a translational movement, which constitutes the change in the relative position, to be oriented in the longitudinal, height and/or width direction of the vehicle seat.

It has been found to be particularly preferable if it is possible for the change in the relative position of the first portion of the first switching console element to be carried out synchronously with the change in the relative position of the first portion of the second switching console element.

In other words, it is sufficient for one of the switching console elements to be moved into the desired position, because the position of the other switching console element is also matched in a desired position, synchronously therewith, by means of the transmission system.

Within the meaning of the present invention, the term "synchronously" is intended to be understood for example to mean that the changes in the relative positions of the first and of the second switching console element can be made simultaneously or substantially simultaneously. In particular, however, the term "synchronously" is intended to be understood to mean that the changes in the relative positions of the first portions of the first and of the second switching console element result in relative positions of the first portions of the first and of the second switching console element that are the same or are analogous with respect to a vehicle seat reference.

Specifically, it is thus possible, in particular as a result of the change in the relative position of the first portion of the first switching console element, for the relative position of the first portion of the first switching console element to be mirror-symmetrical to the relative position of the first portion of the second switching console element, with respect to the vehicle seat, in relation to a reference plane that extends in the longitudinal direction and height direction of the vehicle seat.

The above explanations preferably of course apply when both switching console elements are moved out of a basic relative position (basic position) that is the same with respect to the vehicle seat reference.

It is furthermore preferable for the first and the second switching console element to each comprise a second portion which is directly and rigidly connected to the seat part frame and relative to which the first portion is in each case designed to be displaceable, at least in the longitudinal direction of the vehicle seat, in order to bring about the change in the relative position of the first portions.

The switching console element is preferably mounted on the seat part frame to the side of the seat part, a first portion of the switching console element being designed so as to be displaceable at least in the longitudinal direction of the vehicle seat.

As a result of the connection to the seat part frame, the switching console element therefore preferably follows a movement and/or a pivot movement of the seat part. At the same time, the relative position of a first portion of the switching console element is adjustable in the longitudinal direction of the vehicle seat, and therefore said first portion of the switching console element is always easily accessible.

It is conceivable for the vehicle seat to further comprise at least one armrest. In this case, the control console element is preferably designed so as to be independent of the at least one armrest. Designed so as to be independent means, for example, that there is no mechanical interaction, at all, between the control console element and the armrest. Designed so as to be independent furthermore means, for example, that a movement (displacement and/or pivot movement) of the control console element can be carried out independently of a movement (displacement and/or pivot movement) of the armrest. This preferably also, or only, applies vice versa.

In order to make optimal use of the various elements when mounting the switching console element on the vehicle seat, it is preferable for the switching console element to comprise a second portion which is directly and rigidly connected to the seat part frame and relative to which the first portion is designed to be displaceable, at least in the longitudinal direction of the vehicle seat, by means of a translational movement.

It is thus preferable for the entire switching console element to always follow the pivot movement of the seat part as a result of the rigid connection of the second portion of said switching console element to the seat part frame.

In order to configure the translational movement between the first portion and the second portion of the switching console element so as to be as reliable and low-friction as possible, it is preferable for the second portion of the switching console element to comprise a guide rail element and for the first portion of the switching console element to comprise a carriage element that can be moved relative to the guide rail element by means of the translational movement. It is possible for the guide rail element and the carriage element to be mounted on plain and/or anti-friction bearings relative to one another.

The guide rail element and the carriage element are preferably arranged such that the longitudinal extension thereof extends in the longitudinal and/or height direction of the vehicle seat. More preferably, the guide rail element and the carriage element are arranged such that the longitudinal extension thereof is in parallel with the longitudinal direction of the vehicle seat in each case.

In order to form the rigid connection between the seat part frame and the second portion of the switching console element, it has been found to be advantageous for the second portion of the switching console element to comprise spacer bolts which are each rigidly connected, at a first end, to the seat part frame, and releasably connected, at a second end, to the guide rail element.

For example, at least two, preferably three, spacer bolts may be welded to said seat substructure. In order to guarantee a planar bearing surface of the guide rail element on all three spacer bolts, said spacer bolts may be fastened to a mounting plate prior to welding. Subsequently, the guide rail element can be plugged onto the spacer bolts and fastened for example by means of one collar nut in each case.

For example, two retainers in each case, for control lever carriers, may be mounted on the carriage element, on which retainers the control lever carriers are mounted.

In order to be able to limit the translational movement of the carriage element with respect to the guide rail element, it is advantageous for a mechanical stop element to be arranged at a first and a second end of the guide rail element in each case, which stop element is intended to create a mechanical interaction with the carriage element during the translational movement of the carriage element with respect to the guide rail element.

The stop element is preferably releasably connected to the first and to the second end of the guide rail element. At least two connection elements, which are in particular in the form of locating bores, are preferably arranged on the first and on the second end of the guide rail element in each case, in order to arrange the stop element, which is formed for example as a screw. It would also be conceivable for connection elements to be arranged over the entire length of the guide rail element, preferably at regular mutual spacings of for example 10 mm.

According to a particularly preferred embodiment, the first portion of the switching console element comprises a part which is on the inside in the seat width direction and on which a first shaft is mounted, and a part that is on the outside in the seat width direction and can be pivoted about the first shaft. In particular, the outer part of the first portion of the switching console element is thus adjustable with respect to a degree of inclination, preferably with respect to a degree of inclination relative to the seat width direction. A person skilled in the art knows that, on account of the described mounting, the pivot movement about the first shaft is associated not only with a change in the degree of inclination of the outer part, but also in a change in the position of the outer part in the height direction of the vehicle seat.

The degree of inclination of the second portion of the switching console element as well as of the inner part of the first portion are therefore preferably dependent only on a degree of inclination of the seat part. In contrast, the degree of inclination of the outer part of the first portion of the switching console element is preferably dependent both on the degree of inclination of the seat part and on a degree of the pivot movement of the outer part about the inner part. As a result, coarse adjustment of the degree of inclination of the outer part is preferably possible by means of the degree of inclination of the seat part, and fine adjustment is preferably possible by means of the degree of the pivot movement of the outer part about the inner part.

The longitudinal position of the second portion of the switching console element is furthermore preferably dependent only on a longitudinal position of the seat part. In contrast, the longitudinal position of the first portion of the switching console element is preferably dependent both on the longitudinal position of the seat part and on a degree of displacement of the first portion relative to the second portion of the switching console element.

Particularly preferably, a central axis of the first shaft is arranged so as to be in parallel with the seat width direction. It is furthermore preferable for the first shaft to be arranged at a rear end of the switching console element, such that in particular a front compartment of all the compartments of the outer part of the first portion of the switching console element experiences as large as possible a change in the degree of inclination during the pivot movement about the first shaft. It is thereby possible to achieve significant inclination and height adjustment of the front compartment simply by means of a pivot movement about a small angle.

The control element is advantageously arranged on the outer part and preferably on the front compartment, such that said control element also experiences as large as possible a change in the degree of inclination and can thus be set particularly quickly to the desired inclination and thus also to the desired height. The degree of inclination can also be set relatively precisely by means of the above-mentioned coarse and fine adjustment.

Particularly preferably, a second shaft is arranged on the front end of the switching console element, as part of the mounting means for the front end of the switching console element. A central axis of the second shaft is arranged for example so as to be in parallel with the seat width direction.

A retaining element is particularly preferably arranged on the front end of the switching console element, which retaining element provides a retention force by means of which the switching console element can be retained in position with respect to a pivot movement about the first shaft. Said retaining element is in particular formed as a pneumatic spring element and/or is connected to the second shaft. A pivot movement of the switching console element about the first shaft is thus preferably carried out manually and/or in the direction of or counter to the retention force of the retaining element.

It is preferable for the first and/or the second shaft not to have any degrees of freedom, with respect to the part that is on the inside in the seat width direction, in the radial and/or axial direction. The radial degree of freedom is blocked, for example, in that a clamping screw is arranged on the inner part so as to be perpendicular to the central axis of the first and/or second shaft, the end face of the shank of which screw is in contact, radially on the outside, with the first and/or the second shaft, and thus blocks the rotation of the relevant shaft about the central axis thereof. The axial degree of freedom is blocked, for example, by using two external retaining rings which are arranged on an outside diameter of the relevant shaft and on either side of the part that is on the outside in the seat width direction.

It is also preferable if it is possible to block the translational movement of the carriage element relative to the guide rail element; in particular, the desired relative position of the carriage element with respect to the guide rail element can thus be locked after displacement has taken place in the longitudinal direction. For this purpose, it is advantageous for a mechanical securing element to be arranged on the guide rail element, which securing element can be brought into engagement with the carriage element and is designed to block the translational movement of the carriage element relative to the guide rail element.

Said securing element is formed as a locking bolt element for example. Said element is for example arranged in a recess that is complementary thereto, and in such a way that the central axis of said element is perpendicular to the guide rail element. The locking bolt element preferably comprises an outer sleeve element which at least does not have any translational degrees of freedom relative to the guide rail element, in other words, said sleeve element is arranged such that it is not displaceable relative to the guide rail element, preferably in the direction of the central axis of the locking bolt element. A locking bolt is mounted inside the outer sleeve element so as to be displaceable in the direction of the central axis of the locking bolt element.

While there is preferably no mechanical interaction between the outer sleeve element and the carriage element, mechanical interaction between the locking bolt and the carriage element can preferably be created by means of a displacement of the locking bolt in the direction of the central axis of the locking bolt element, towards the carriage element. The locking bolt can preferably be inserted into one of at least two bores on the carriage element. The at least two bores are particularly preferably arranged in the longitudinal direction of the carriage element. If there are more than two bores, two adjacent bores are preferably identically mutually spaced in each case.

A displacement of the locking bolt inside the sleeve element can preferably be created by means of an end of the locking bolt that is remote from the carriage element being connected to a further Bowden cable element that can be subjected to tensile and compressive stress. It is furthermore preferable for a lever, operable by a user of the vehicle seat, to be arranged on the vehicle seat, which lever is connected to the locking bolt by means of the further Bowden cable element.

If the user pivots or displaces the lever in a first direction, a core of the further Bowden cable element, which is formed in particular as a wire cable, is subjected to tensile stress, and the locking bolt slides out of a bore on the carriage element. Subsequently, the displacement of the carriage element relative to the guide rail element can take place.

If the user pivots or displaces the lever in a second direction, the core is subjected to compressive stress, and the locking bolt can slide into another bore on the carriage element. Particularly preferably, an adjustment element, for example in the form of a set screw, is arranged on the lever, by means of which adjustment element a preload of the core can be changed.

In addition or alternatively, the locking bolt may be spring-loaded relative to the outer sleeve, the force of a spring of the spring mounting being suitable for moving the locking bolt towards the carriage element.

An outer sheath of the further Bowden cable element (also referred to as the cable sheath or the arc), inside which the core of the further Bowden cable element is displaceably mounted, is advantageously fastened to the seat substructure, for example by means of a retaining plate and a clamping screw, such that the position of the outer sheath relative to the seat substructure is fixed.

It is advantageous, for the benefit of greater cost efficiency, if only one of the switching console elements is provided with its own locking means. The other switching console element is advantageously locked by means of the transmission system.

Therefore, according to a preferred embodiment, as described above, the change in the relative position of the first portion of the first and of the second switching console element can be made in the longitudinal direction of the vehicle seat. A plurality of embodiments of the transmission system are conceivable in order to allow for a synchronous movement of both first portions.

For example, a first embodiment of the transmission system has been found to be advantageous, according to which the transmission system is purely, i.e. exclusively, mechanical and forms a Bowden cable system, the first portion of the first and of the second switching console element in each case comprising a front and a rear end, of which at least two are directly connected to the Bowden cable system.

According to a first variant of the first embodiment of the transmission system, it is conceivable for the Bowden cable system to comprise a first Bowden cable element which is directly connected to the front end of the first portion of the first switching console element and to the rear end of the first portion of the second switching console element in each case, and a second Bowden cable element which is directly connected to the front end of the first portion of the second switching console element and to the rear end of the first portion of the first switching console element in each case.

Two Bowden cable elements are thus interconnected so as to cross over, such that one of the control lever carriers, when pushed forwards, pulls the other control lever carrier forward therewith, resulting in a space-saving and easily achievable form of synchronisation.

In this case, it is sufficient if it is possible to subject the two Bowden cable elements purely to tensile stress in the case of a change in the relative position of the first portion of the first switching console element, for example in the case of a translational movement forwards or backwards. The two Bowden cable elements can thus be constructed such that the actual force transmission element (core) thereof is designed as an element that is resistant only to tensile stress, and is provided, for example, in the form of a rope, which does not need be a steel rope.

According to a second variant of the first embodiment of the transmission system, it is conceivable for the Bowden cable system to comprise a single Bowden cable element which can be subjected to tensile and compressive stress and which is directly connected to one of the front ends and directly connected to one of the rear ends of the first portions of the switching console elements.

Therefore, in this case, in the event of a change in the relative position of the first portion of the first switching console element, the single Bowden cable element has to be able to be subjected to a tensile load in a first direction and to a compressive load in a second direction. The single Bowden cable element thus has to be constructed such that the actual force transmission element (core) thereof is designed as an element that is resistant to tensile stress and compressive stress, and is provided, for example, in the form of a steel rope.

Resistant to tensile stress means that the relevant element is designed to transmit tensile forces. Resistant to compressive stress means that the relevant element is designed to transmit compressive forces.

Depending on the prevailing space conditions, it may be more favourable to implement a solution using two Bowden cable elements, because, in the case of an element that is resistant only to tensile stress, the values of the minimally permissible bending radii when laying or mounting the Bowden cable element are not too high. Furthermore, the costs for one of the lower quality cable elements are less than those in the case of the solution using just one Bowden cable element.

In contrast, a solution using just one Bowden cable element provides the advantage that the cable element is designed so as to be more resistant to wear. Furthermore, material savings are possible owing to the omission of a second Bowden cable element.

It is advantageous for the first and the second variants of the first embodiment of the transmission system for the second portion of the first and of the second switching console element to in each case comprise a front and a rear end, the Bowden cable elements each comprising a stationary sheath which is connected to two of the front and rear ends of the second portions of the first and of the second switching console element in each case, and the Bowden cable elements each comprising a movable core which is connected to two of the front and rear ends of the first portions of the first and of the second switching console element in each case.

A second embodiment of the transmission system has also been found to be advantageous, for example, according to which the transmission system is pneumatic and/or hydraulic at least in part and forms a cylinder system, the first portion of the first switching console element and the first portion of the second switching console element each being connected to the cylinder system.

It is furthermore advantageous for the cylinder system to comprise a first cylinder element which is directly connected to the front end of the first switching console element and is connected to the rear end of the second switching console element by means of a conducting element, and to comprise a second cylinder element which is directly connected to the rear end of the first switching console element and is connected to the front end of the second switching console element by means of the at least one conducting element. The conducting element is preferably used for receiving and for guiding the hydraulic and/or pneumatic medium.

The connections of the cylinder elements thus cross over, as in the case of the Bowden cable elements. One cylinder element per switching console element is sufficient when using tension-compression cylinders.

The two cylinder elements are preferably arranged such that the central axis thereof is aligning with the longitudinal extension of the first portion of one of the switching console elements.

When using a hydraulic and/or pneumatic transmission system, it is preferable for a closed circuit to be formed with respect to the medium used (hydraulic medium such as oil, or pneumatic medium such as nitrogen). A circuit is thus generally defined as "closed" when the fluid/the gas is not stored (in a tank) at ambient pressure, but rather in a reservoir at a specified system pressure (as will be described in greater detail below, with reference to FIG. 7). The movement of the piston rod assemblies relative to the housings can thus take place using a preload of the medium, which significantly reduces the energy requirement for changing the position of the first part of the switching console elements.

It is furthermore advantageous for the second portion of the first and of the second switching console element to in each case comprise a front and a rear end, the cylinder elements each comprising a stationary housing and a piston rod assembly that is movable relative to the housing, the stationary housing being connected, in particular directly, in each case to one of the front or rear ends of the second portions of the first or of the second switching console element, and the piston rod assemblies being directly connected to one of the front or rear ends of the first portions of the first or of the second switching console element in each case.

A person skilled in the art knows that the piston rod assemblies comprise for example a piston rod (conrod) and a piston. Furthermore, in particular a piston chamber is arranged between the housing and the piston rod assembly, which piston chamber is designed to receive the medium. The two piston chambers of the two cylinder elements are preferably arranged so as to be directly adjacent to the conducting element, in the circuit, the medium preferably being received exclusively in the two piston chambers and in the conducting element. Furthermore, a carriage is preferably arranged inside the conducting element, which carriage is sealed off from the medium and to which the first portion of the switching console elements, which is not directly connected to the piston rod assemblies, is connected. The carriage preferably divides the space in which the medium is received into two, for example, identically sized space portions. The same preload of the medium (system pressure) preferably prevails in the two space portions.

BRIEF DESCRIPTION OF THE DRAWINGS

Advantages and expedient features can be found in the following description, in conjunction with the drawings.

In the drawings:

It should be noted that some components are not shown in some of the figures, for the purpose of clarity. For example, FIG. 2a-c do not show the control lever element 5, and FIG. 3a-f show only parts of the switching console element 4.

DETAILED DESCRIPTION

Figure 1:
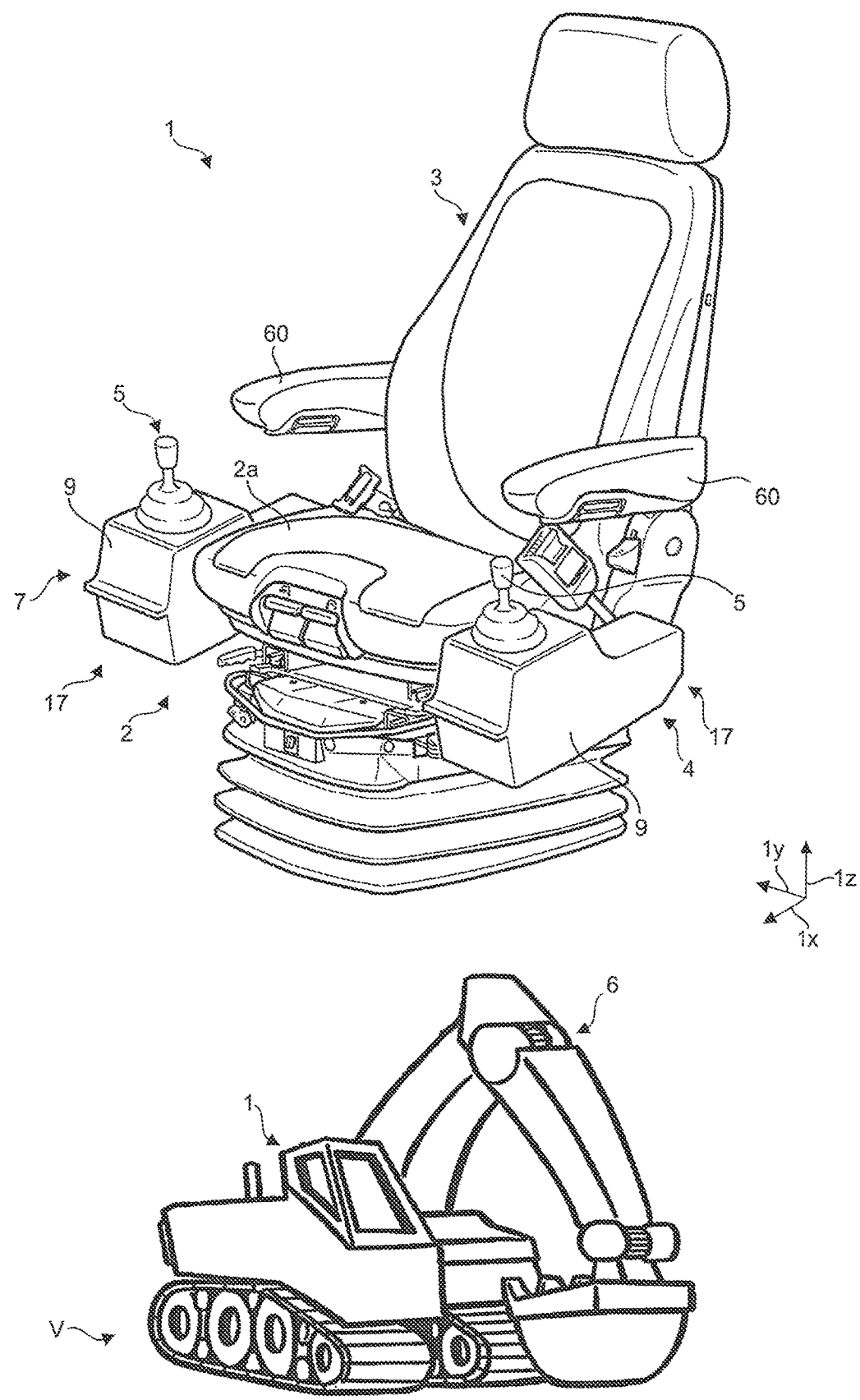
FIG. 1 is a perspective view of a vehicle seat according to the invention.

Accordingly, FIG. 1 shows a vehicle seat 1 for a vehicle V, shown in this case as an excavator, comprising a seat part 2 and comprising a backrest part 3, the seat part 2 and/or the backrest part 3 being adjustable with respect to a degree of inclination. Furthermore, in this example, two switching console elements 4, 7, each comprising a control element 5 in the form of a joystick for actuating at least one function of at least one actuator element 6 (in this case in the form of a motor for moving an excavator shovel arm of the vehicle V) are arranged on the vehicle seat 1.

Furthermore, all of FIG. 1-7 show a coordinate system comprising the longitudinal direction 1x having an arrowhead pointing forwards, the width direction 1y having an arrowhead pointing to the right, and the height direction 1z of the vehicle seat 1 having an arrowhead pointing upwards, in each case from the perspective of a user (not shown) of the vehicle seat 1.

In the present case, the seat part 2 comprises a seat cushion part 2a and a seat part frame 2b. One 4 of the switching console elements 4, 7 is mounted on the seat part frame 2b (see FIG. 3a) and to the side, in this case from the perspective of the user (not shown) of the vehicle seat 1, on the left of the seat part 2. The other 7 of the switching console elements 4, 7 is mounted on a seat part frame 2b (see FIG. 3a) of the seat part 2 and to the side, in this case from the perspective of the user (not shown) of the vehicle seat 1, on the right of the seat part 2. The relative positions of both switching console elements are identical, with respect to the vehicle seat 1, with regard to a displacement in the longitudinal direction 1x, and are shown in a basic position in particular according to FIGS. 1, 2a, 2b, 2c, 6a, 6b and 7.

Unless otherwise specified, the following description always refers to the switching console element 4 that is mounted to the left of the seat part 2. It is of course clear to a person skilled in the art that the following features and descriptions may also apply analogously for the switching console element 7 that is mounted to the right of the seat part 2.

In the present case, the relative position of a first portion 4a of the first switching console element 4 with respect to the vehicle seat 1 can be changed, it being possible for the change in the relative position of the first portion 4a of the first switching console element 4 to be transferred into a change in a relative position of a first portion 7a of the second switching console element 7, with respect to the vehicle seat 1, by means of a transmission system 10 which is free of electronic components. In the present case, the change in the relative position of the first portion 4a of the first switching console element 4, with respect to the vehicle seat 1, can be made in the longitudinal direction 1x.

Figure 2A:
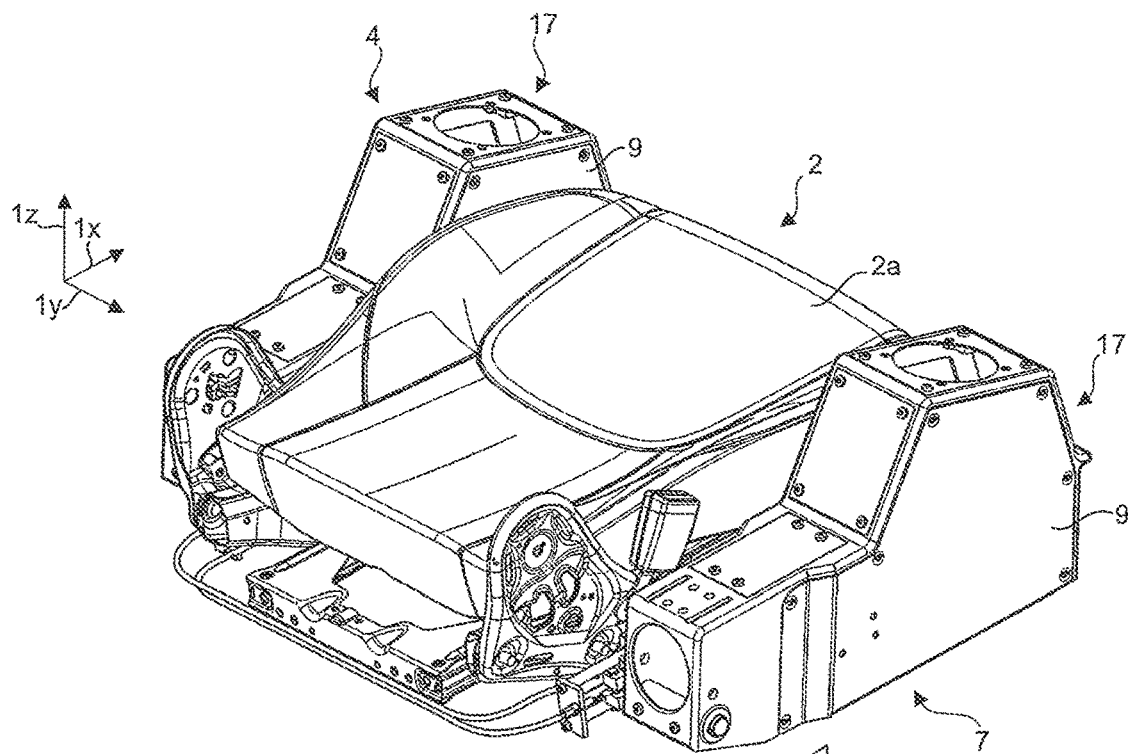
FIG. 2a-2c are different views of a seat part of the vehicle seat according to FIG. 1, together with parts of two switching console elements.
Figure 2B:
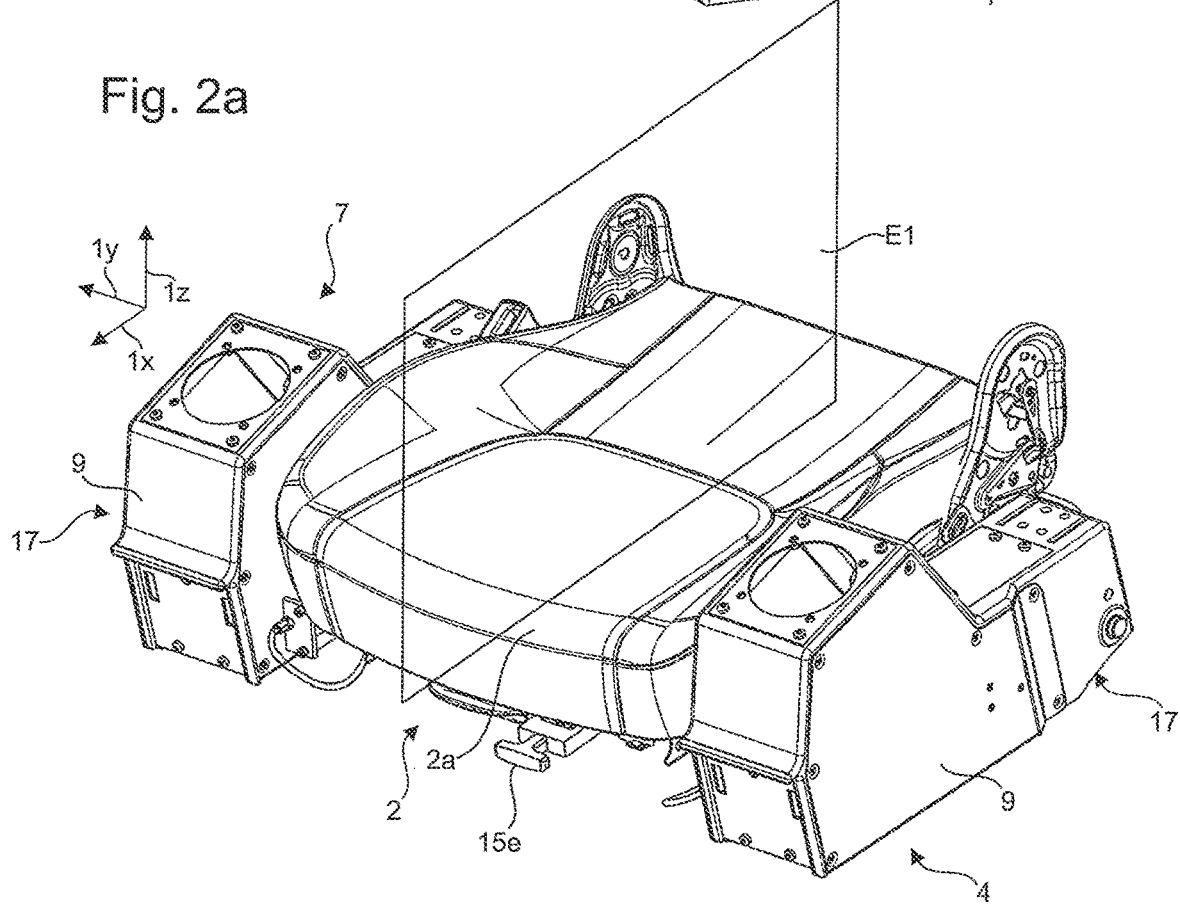
Figure 2C:
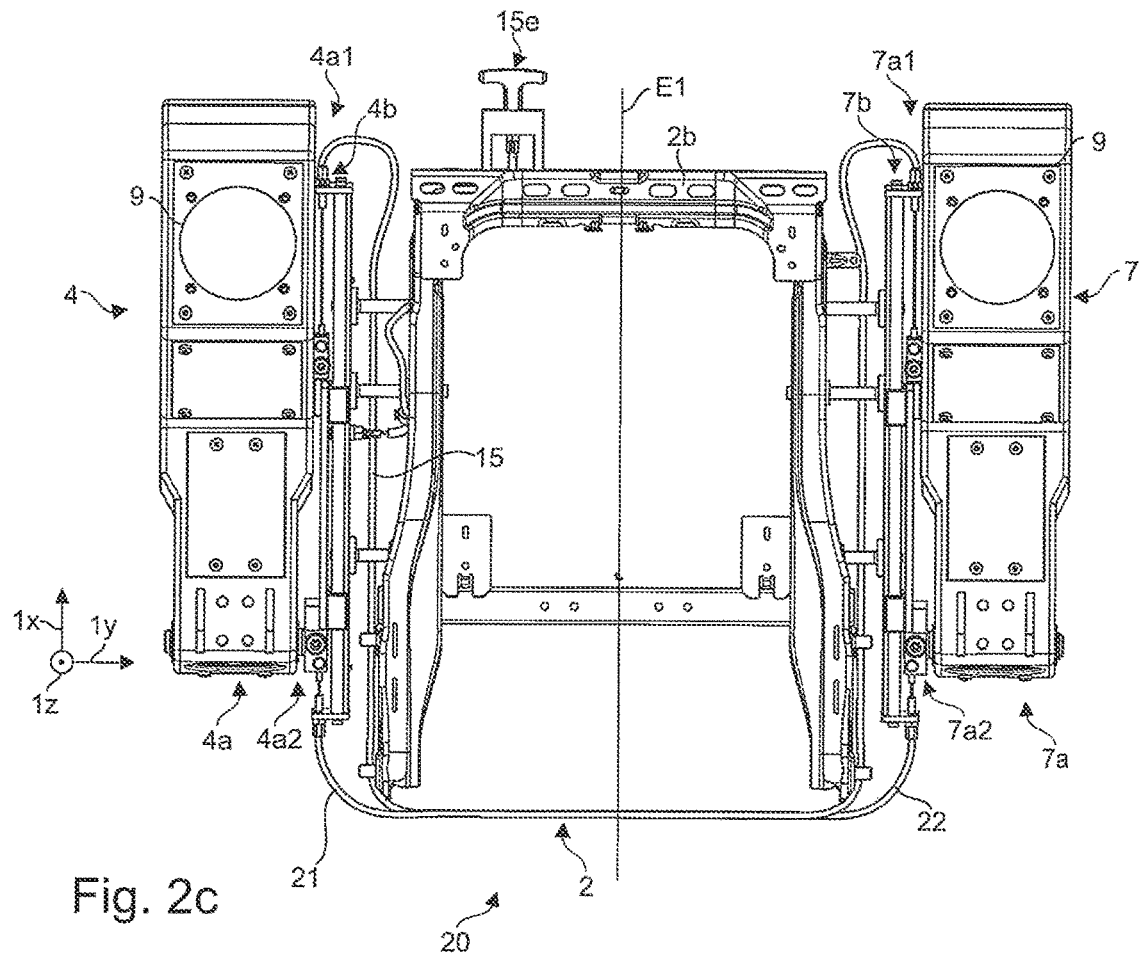

The present FIG. 2c shows that only the switching console element 4 is provided with its own locking means (see the description below with reference to the locking bolt element 15). Furthermore, the switching console element 7 is coupled to the switching console element 4 by means of a transmission system 20 (see in particular FIG. 3c and FIG. 6a). In the present case, the transmission system 20 is suitable for transmitting the above-described translational movement and the locking from one switching console element 4 to the other 7.

The vehicle seat shown makes it possible for the change in the relative position of the first portion 4a of the first switching console element 4 to be carried out synchronously with the change in the relative position of the first portion 7a of the second switching console element 7, such that the relative position of the first portion 4a of the first switching console element 4 is mirror-symmetrical to the relative position of the first portion 7a of the second switching console element 7, with respect to the vehicle seat 1, in relation to a reference plane E1 (see FIGS. 2b and 2c) that extends in the longitudinal direction 1x and height direction 1z of the vehicle seat 1. For example, the reference plane E1 is equidistant, in the width direction 1y, from the first 4 and from the second switching console element 7.

In the present case, the first switching console element 4 and the second switching console element 7 each comprise a second portion 4b, 7b which is directly and rigidly connected to the seat part frame 2b and relative to which the first portion 4a, 7a is in each case designed to be displaceable, at least in the longitudinal direction 1x of the vehicle seat 1, in order to bring about the change in the relative position of the first portions 4a, 7a.

Furthermore, in the present case, the transmission system 20 is free of electronic components and, in this example, designed so as to be exclusively mechanical, in the form of a Bowden cable system, the first portion 4a, 7a of the first 4 and of the second switching console element 7 each comprising a front 4a1, 7a1 and a rear end 4a2, 7a2, of which at least two are directly connected to the Bowden cable system 20. According to the embodiment of FIG. 6a, all four ends 4a1, 7a1, 4a2, 7a2 are connected to the Bowden cable system 20. According to the embodiment of FIG. 6b, only two 4a2, 7a1 of the four ends 4a1, 7a1, 4a2, 7a2 are connected to the Bowden cable system 20.

Figure 6A:
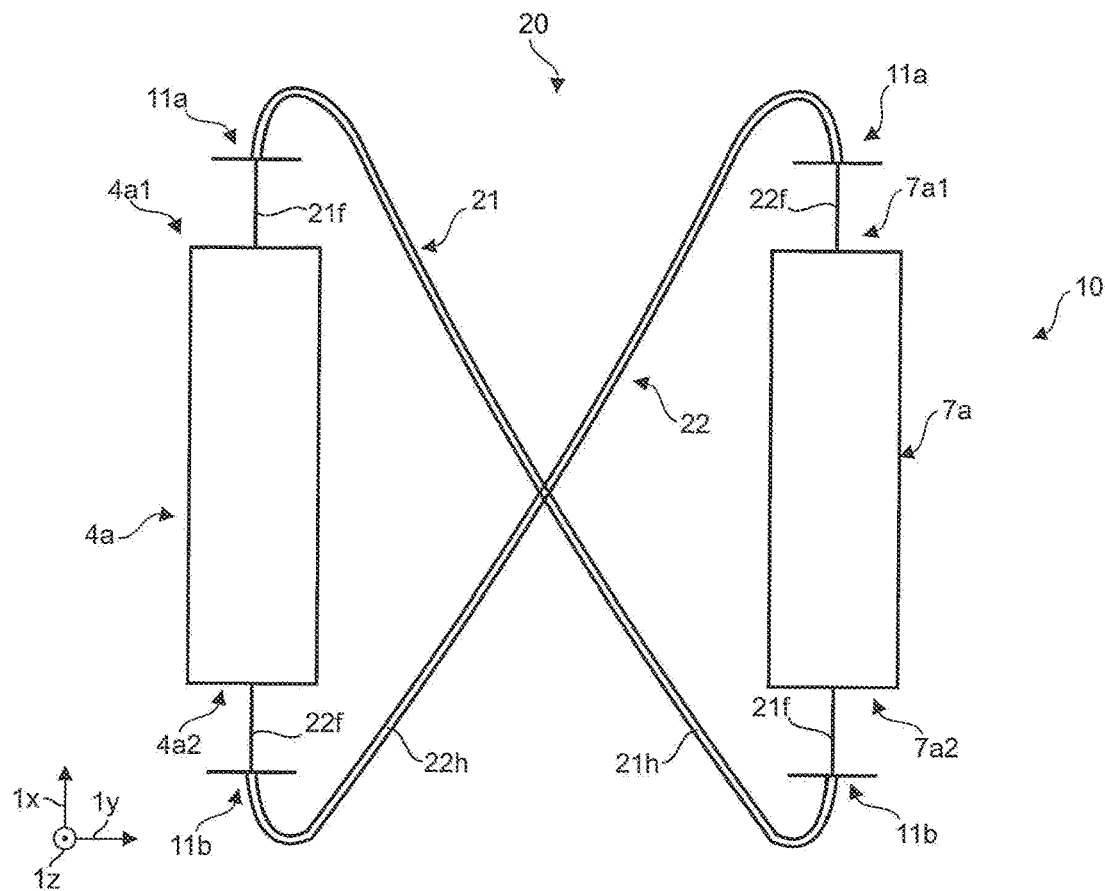
FIG. 6a, 6b schematically show purely mechanical solutions for the transmission system.

In the example in FIG. 6a, the Bowden cable system comprises a first Bowden cable element 21 which is directly connected to the front end 4a1 of the first portion 4a of the first switching console element 4 and to the rear end 7a2 of the first portion 7a of the second switching console element 7 in each case, and a second Bowden cable element 22 which is directly connected to the front end 7a1 of the first portion 7a of the second switching console element 7 and to the rear end 4a2 of the first portion 4a of the first switching console element 4 in each case (see also FIG. 2c). In order that the first parts 4a, 7a of the switching console elements 4, 7 can be displaced together and in a synchronous manner, said parts are connected by the two Bowden cable elements 21, 22 in a crossed manner.

Figure 6B:
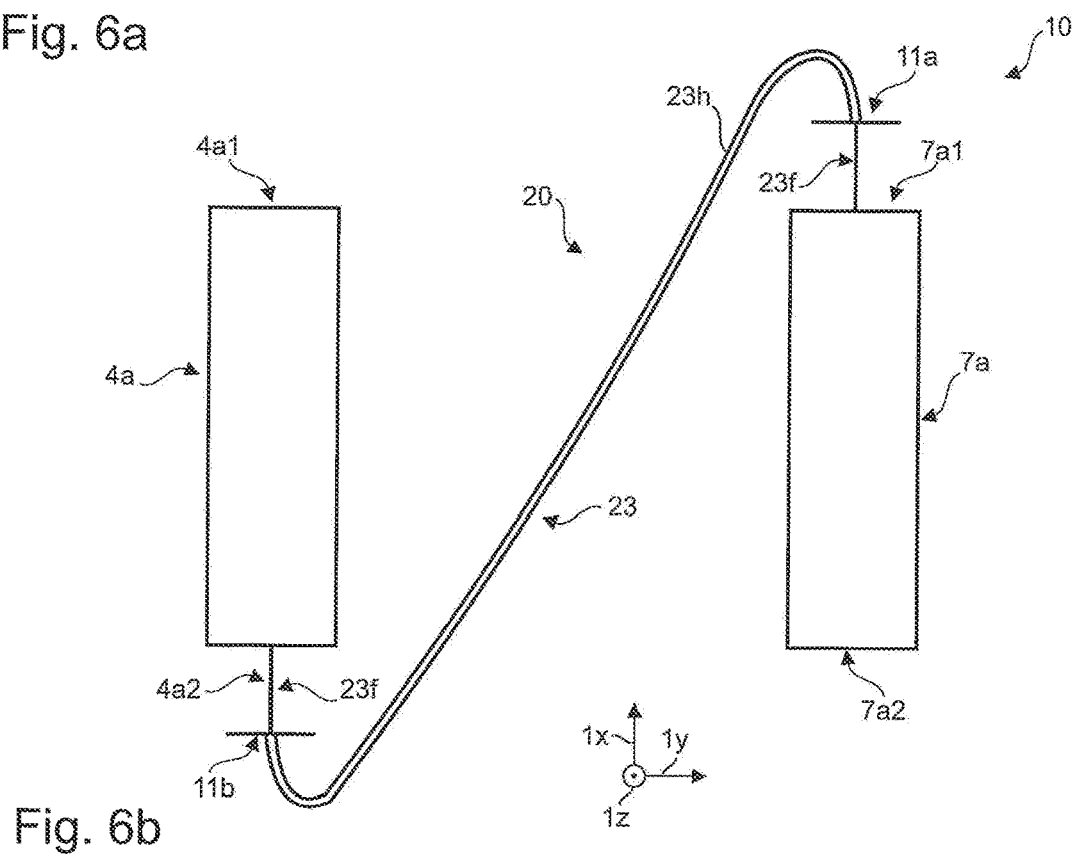

FIG. 6b schematically shows a second variant of the first embodiment of the transmission system, according to which the Bowden cable system 20 comprises a single Bowden cable element 23 which can be subjected to tensile and compressive stress and which is directly connected to one 7a1 of the front ends 4a1, 7a1 and directly connected to one 4a2 of the rear ends 4a2, 7a2 of the first portions 4a, 7a of the switching console elements 4, 7.

Figure 3A:
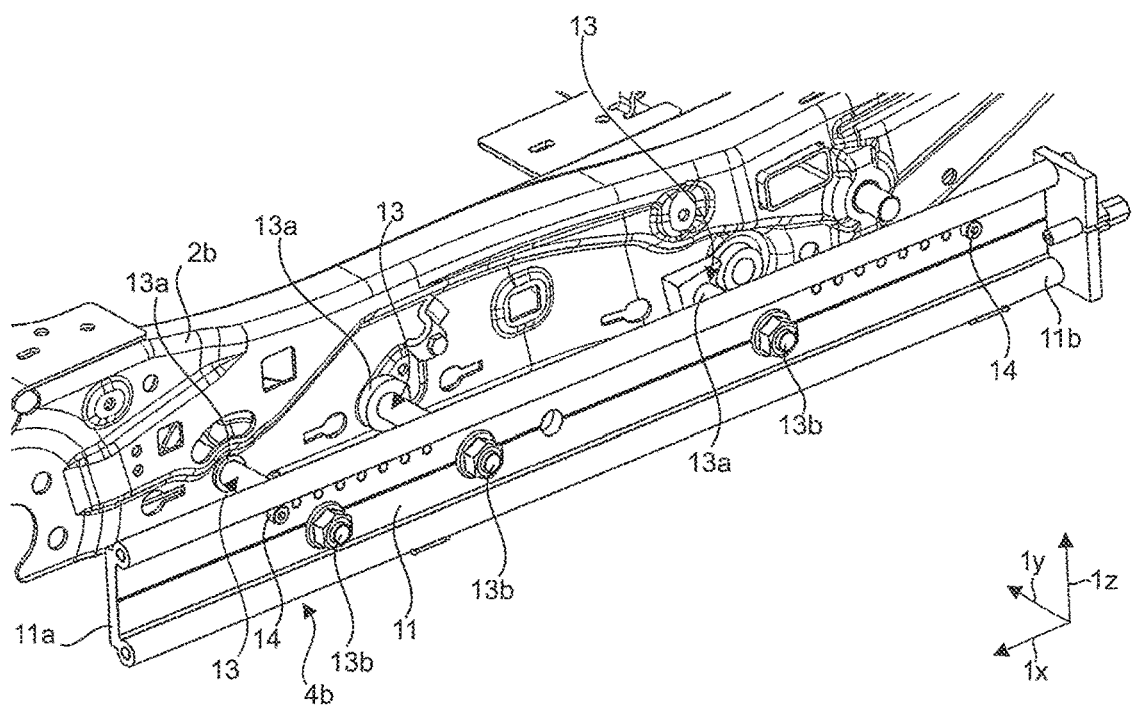
FIG. 3a-3f are different views of the seat substructure of the seat part according to FIG. 2a-2c, comprising the guide rail element and the carriage element of the switching console element.

The ends of the cores 21f, 22f of the Bowden cable elements 21, 22 are connected to the retainers 16 for the control lever carrier 17 or for the housing 9 by means of a pin 43. Inserts for positioning the Bowden cable element 21, 22 are located in the retainers 16. Plates 44, in which a set screw 45 is screwed in order to tension the Bowden cable elements 21, 22 and to orient the control lever carrier 17, are mounted on the ends 11a, 11b of the guide rails 11 as counter-retainers for the Bowden cable elements 21, 22 (in this case, for example, FIGS. 3d and 3e show a tension of the Bowden cable elements that is set to a minimum value). It is conceivable for the single Bowden cable element 23 to be mounted and fastened, relative to the retainers 16 and guide rails 11, in a manner identical to the Bowden cable elements 21, 22.

In particular FIGS. 6a and 6b also schematically show that the second portion 4b, 7b of the first 4 and of the second switching console element 7 each comprise a front 4b1, 7b1 and a rear end 4b2, 7b2, the Bowden cable elements 21, 22; 23 each comprising a stationary sheath 21h, 22h; 23h which is connected to two of the front 4b1, 7b1 and rear ends 4b2, 7b2 of the second portions 4b, 7b of the first 4 and/or of the second switching console element 7 in each case. In this case, for example the stationary sheath 21h of the first Bowden cable element 21 is connected to the front end 11a of the slide rail 11 of the second portion 4b of the first switching console element 4 and to the rear end 11b of the slide rail 11 of the second part 7b of the second switching console element 7.

It can also be seen that the Bowden cable elements 21, 22; 23 each comprise a movable core 21f, 22f; 23f which is connected to two of the front 4a1, 7a1 and rear ends 4a2, 7a2 of the first portions 4a, 7a of the first 4 and of the second switching console element 7 in each case. In this case, for example the movable core 21f of the first Bowden cable element 21 is connected to the front end 4a1 of the first portion 4a of the first switching console element 4 and to the rear end 7b1 of the first portion 7a of the second switching console element 7.

The switching console element 4 comprises a control lever carrier having a housing 9 which is used in particular for mounting the control lever element 5 and for protecting signal lines to the control lever element.

Figure 3B:
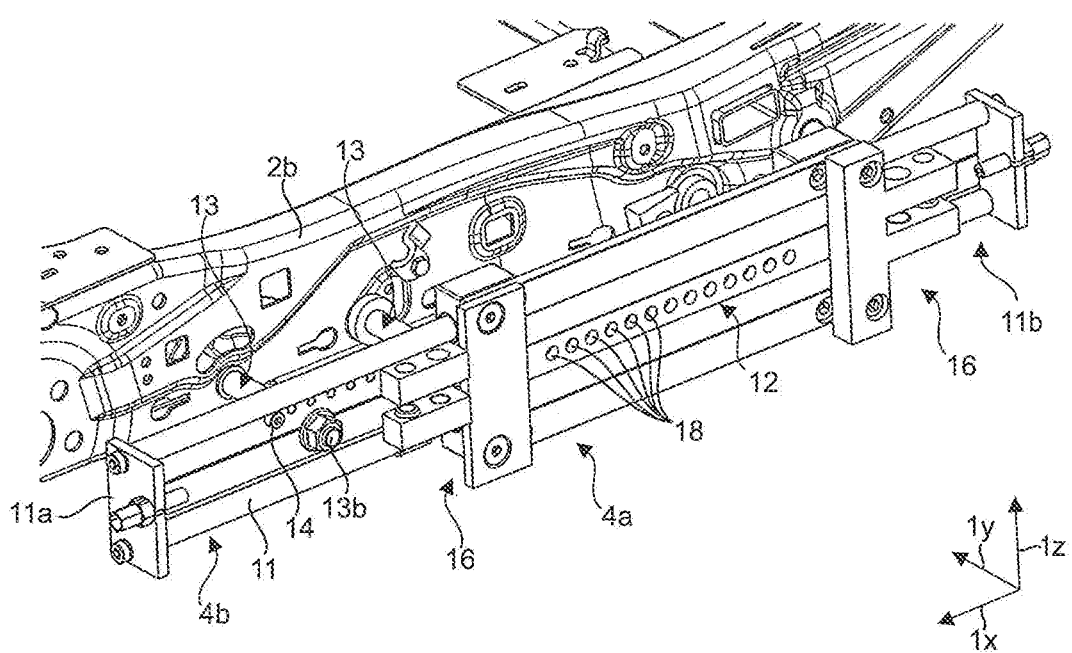
Figure 3C:
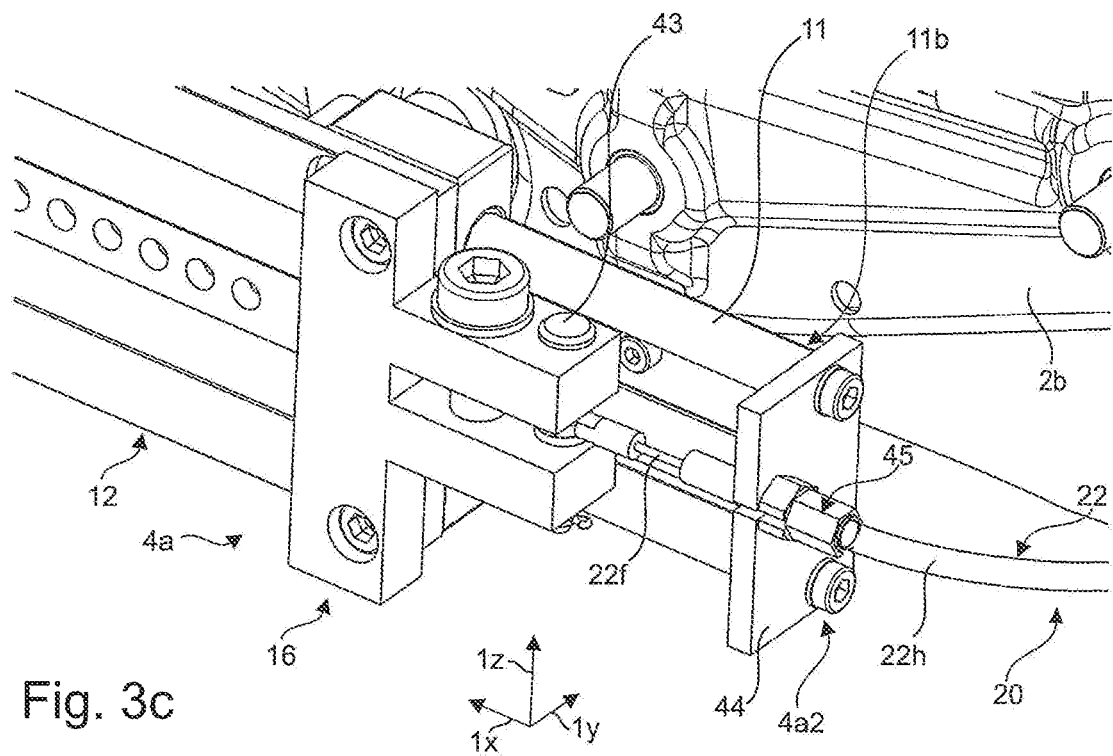
Figure 3D:
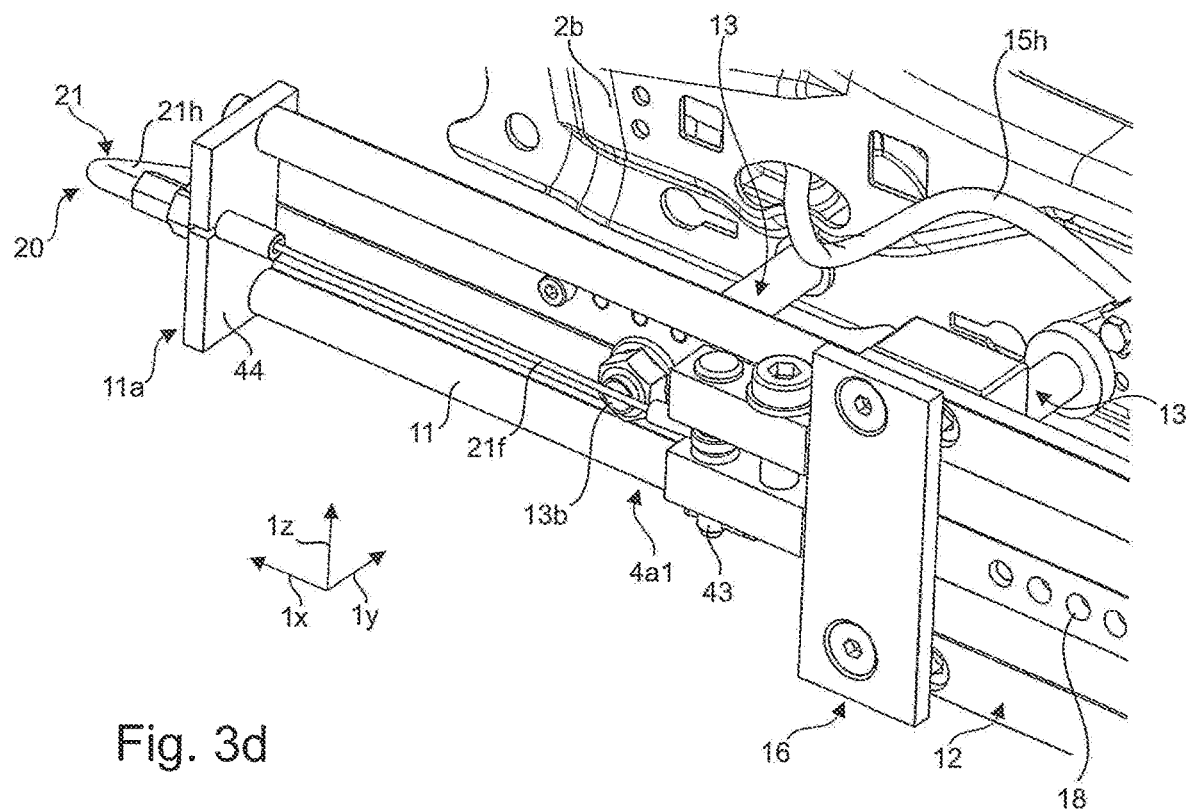
Figure 3E:
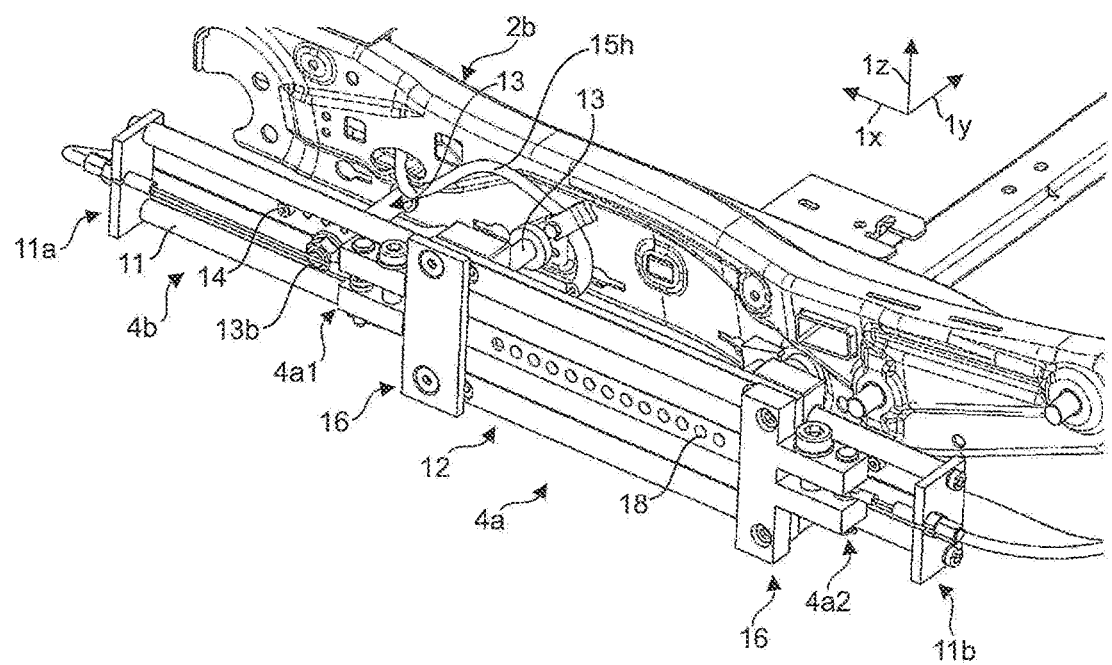
Figure 3F:
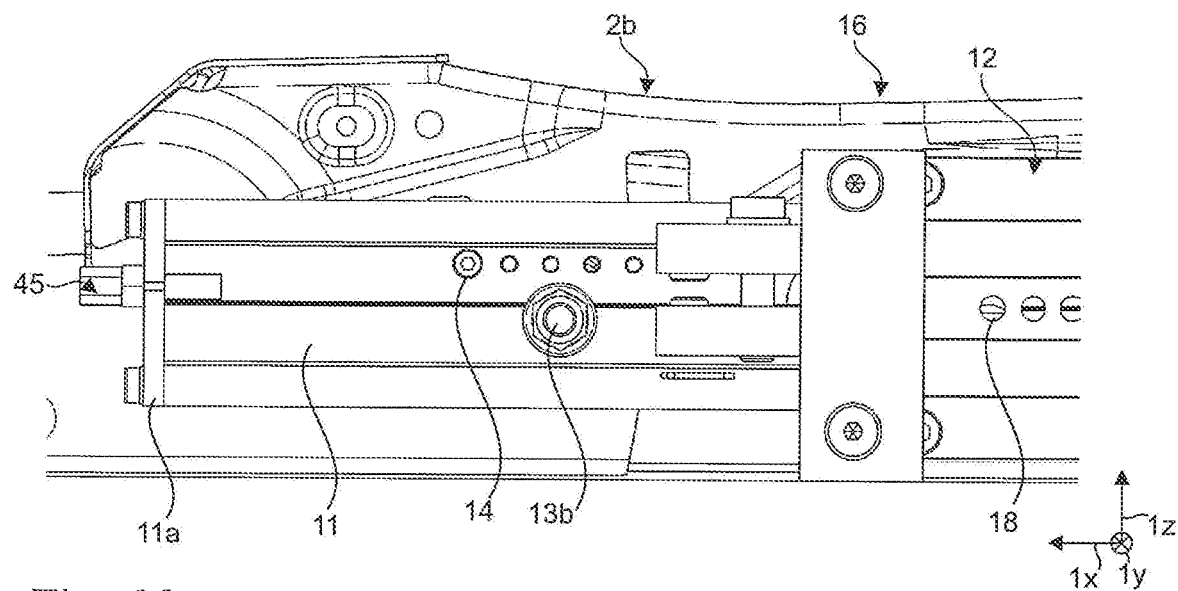

FIG. 3b shows, for example, the first portion 4a of the switching console element 4, which portion is designed so as to be displaceable at least in the longitudinal direction 1x of the vehicle seat 1.

It can be seen that, in this example, the vehicle seat 1 comprises two armrests 60. In this case, the control console element 4 is designed so as to be independent of both armrests 60. In the present case, there is no mechanical interaction, at all, between the control console element 4 and the armrest 60. Furthermore, a movement (displacement and/or pivot movement) of the control console element 4 can be carried out independently of a movement (displacement and/or pivot movement) of the armrest 60; in the present case, this also applies vice versa.

FIG. 3a shows only a second portion 4b of the switching console element 4, but not the first portion 4a. It can be seen that the switching console element 4 comprises the second portion 4b that is directly and rigidly connected to the seat part frame 2b. The first portion 4a is designed so as to be displaceable relative to said second portion, in the longitudinal direction 1x of the vehicle seat 1, by means of a translational movement.

In the present case, it is thus ensured that at least the second portion 4b always follows the pivot movement of the seat part 2 as a result of the rigid connection to the seat part frame 2b. However, as will be explained in more detail below, it is preferable for the switching console element 4 to be adjustable again, independently of the seat part 2, with respect to a degree of inclination, at least in portions, specifically in particular a part 42 of the first portion 4a of the switching console element 4.

FIG. 3b, in particular, shows that the second portion 4b of the switching console element 4 comprises a guide rail element 11, and the first portion 4a of the switching console element 4 comprises a carriage element 12 that can be moved relative to the guide rail element 11 by means of the translational movement. In this example, the guide rail element 11 and the carriage element 12 are mounted on plain bearings relative to one another.

In the present case, the guide rail element 11 and the carriage element 12 are arranged such that the longitudinal extension thereof extends in the longitudinal 1x and height direction 1z of the vehicle seat 1. Furthermore, the guide rail element 11 and the carriage element 12 are arranged such that the longitudinal extension thereof extends in parallel with the longitudinal direction 1x of the vehicle seat 1.

In order to form the rigid connection between the seat part frame 2b and the second portion 4b of the switching console element 4, in the present case, the second portion 4b of the switching console element 4 comprises three spacer bolts 13 which are each rigidly connected, at a first end 13a, to the seat part frame 2b, and releasably connected, at a second end 13b, to the guide rail element 11 (see in particular FIG. 3a). In the present case, the guide rail element is plugged onto the spacer bolts and fastened by means of one collar nut in each case.

In the present case, two retainers 16 for the control lever carrier 17 or for the housing 9 are mounted on the carriage element 12 in each case.

FIG. 3a furthermore shows that a mechanical stop element 14 is arranged in each case at a first end 11a of the guide rail element 11 that is at the front in the longitudinal direction 1x, and at a second end 11b of said guide rail element that is at the rear in the longitudinal direction 1x, which stop element is intended to create a mechanical interaction with the carriage element 12 during the translational movement of the carriage element 12 with respect to the guide rail element 11.

In the present case, the stop element 14 is releasably connected to the first end 11a and to the second end 11b of the guide rail element 11. In the present case, a plurality of connection elements, in the form of locating bores, are arranged on the first end 11a and on the second end 11b of the guide rail element 11 in each case, in order to arrange the stop element 14, which is formed as a screw in the present case.

Figure 4:
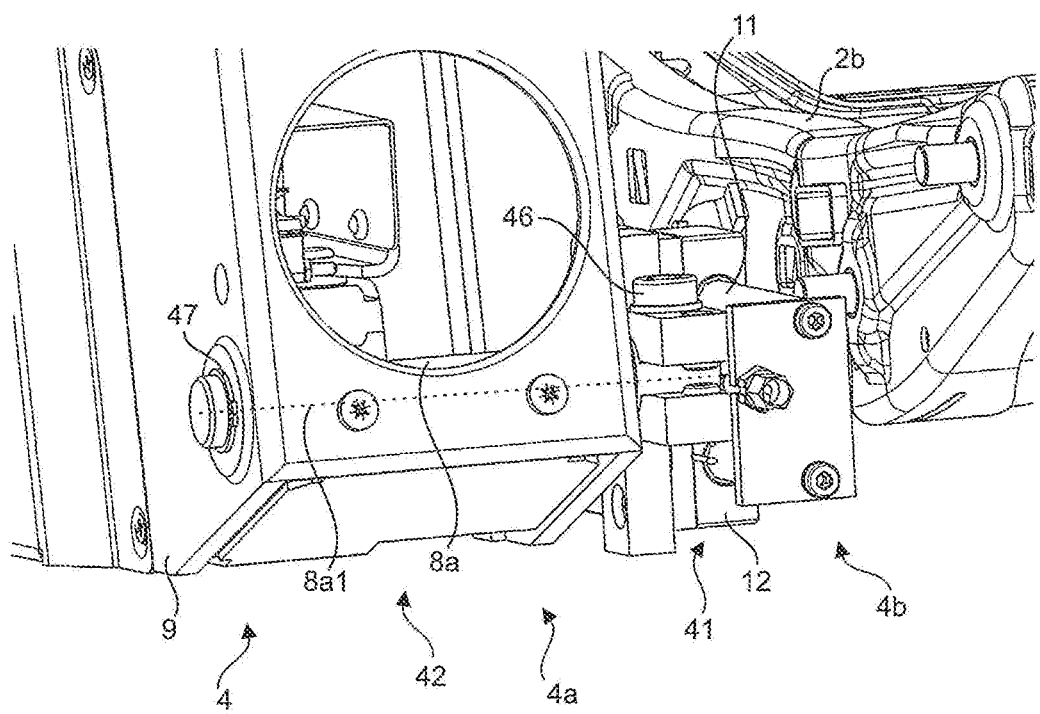
FIG. 4 is a perspective view of the switching console element comprising the first shaft.

According to FIG. 4, the first portion 4a of the switching console element 4 comprises a part 41 which is on the inside in the seat width direction 1y and on which a first shaft 8a is mounted, and a part 42 that is on the outside in the seat width direction 1y and can be pivoted about the first shaft 8a. In the present case, the central axis 8a1 of the first shaft 8a is arranged so as to be in parallel with the seat width direction 1y. Furthermore, the first shaft 8a is arranged on a rear end of the switching console element 4 and is secured radially relative to the inner part 41 by means of a clamping screw 46, and axially relative to the housing 9 by means of two external retaining rings 47 (only one of which is shown).

In the present case, a second shaft (not shown) is arranged on the front end of the switching console element 4, as part of the mounting means for the front end of the switching console element 4, the mounting of which shaft relative to the inner part 41 and/or to the housing 9 is identical to the mounting of the first shaft 8a, for example. Furthermore, a retaining element (not shown) is arranged on the front end of the switching console element 4, which retaining element provides a retention force by means of which the switching console element 4 can be retained in position with respect to a pivot movement about the first shaft 8a.

The degree of inclination of the second portion 4b and of the part 41 of the first portion 4a is therefore dependent only on a degree of inclination of the seat part 2. The degree of inclination of the part 42 of the first portion 4a is furthermore dependent both on the degree of inclination of the seat part 2 and on a degree of the pivot movement of the part 42 about the part 41.

Figure 5A:
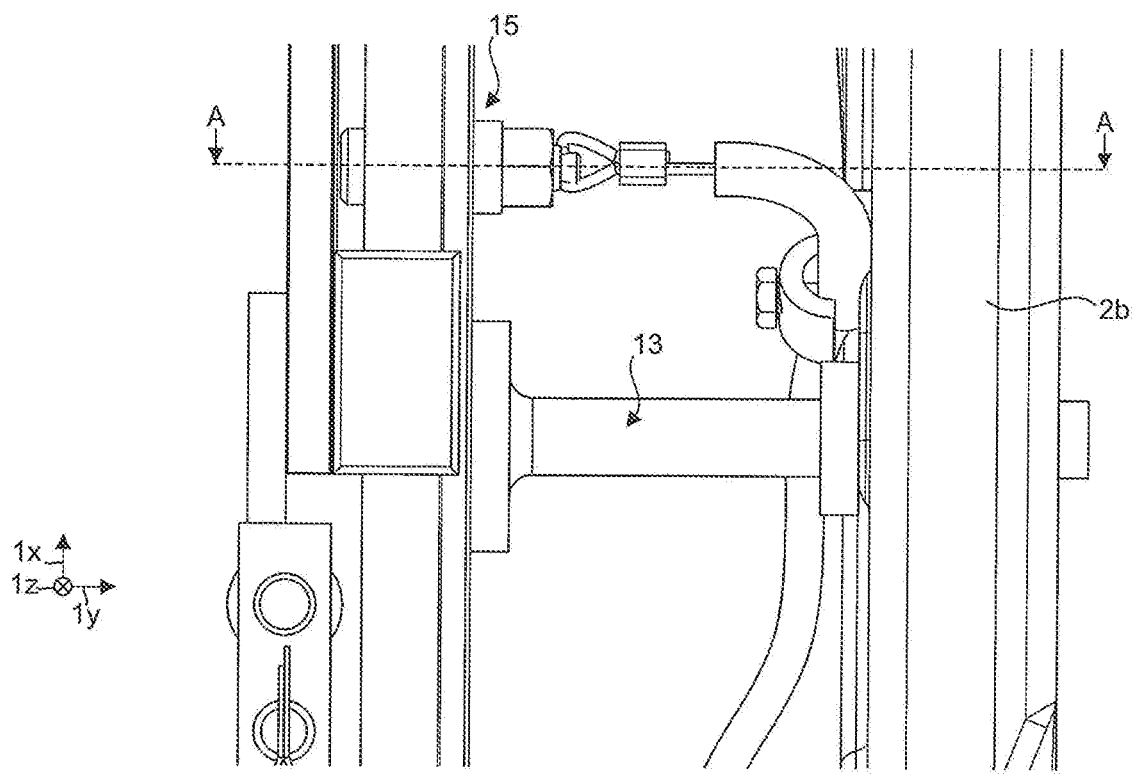
FIG. 5a, 5b are different views of the locking means between the guide rail element and the carriage element of the switching console element.
Figure 5B:
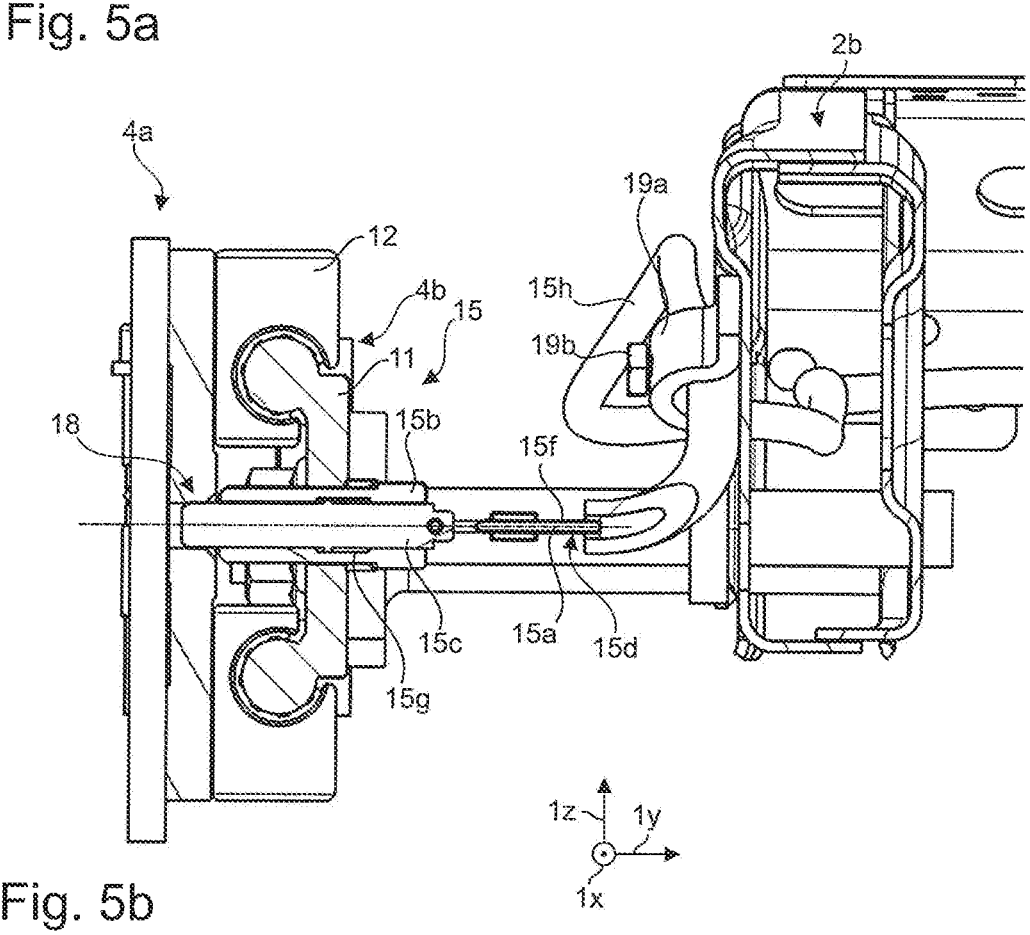

It is clear from FIGS. 5a and 5b that, in the present case, the translational movement of the carriage element 12 relative to the guide rail element 11 can be blocked. In this case, FIG. 5b is a cross-sectional view along the line A-A from FIG. 5a. It can be seen that a mechanical securing element 15 is arranged on the guide rail element 11, which securing element can be brought into engagement with the carriage element 12 and is designed to block the translational movement of the carriage element 12 relative to the guide rail element 11.

In the present case, said securing element 15' is formed as a locking bolt element 15. Said element is arranged in a recess that is complementary thereto, and in such a way that the central axis 15a of said element is perpendicular to the guide rail element 11. The locking bolt element 15 preferably comprises an outer sleeve element 15b which at least does not have any translational degrees of freedom relative to the guide rail element 11; in other words, in the present case, said sleeve element is thus arranged such that it is not displaceable relative to the guide rail element 11b in the direction of the central axis 15a of the locking bolt element 15. A locking bolt 15c is mounted inside the outer sleeve element 15b so as to be displaceable in the direction of the central axis 15a of the locking bolt element 15.

While there is no mechanical interaction between the outer sleeve element 15b and the carriage element 12, mechanical interaction between the locking bolt 15c and the carriage element 12 can be created by means of a displacement of the locking bolt 15c in the direction of the central axis 15a of the locking bolt element 15, towards the carriage element 12. In the present case, the locking bolt 15c can be inserted into one of a plurality of bores 18 (see FIG. 3b, according to which some of the bores are referenced) on the carriage element 12. In the present case, the bores 18 are arranged in the longitudinal direction of the carriage element 12, two adjacent bores being identically mutually spaced in each case.

In the present case, a displacement of the locking bolt 15c inside the sleeve element 15b can be created by means of an end of the locking bolt 15c that is remote from the carriage element 12 being connected to a Bowden cable element 15d. Furthermore, a lever 15e (see in particular FIGS. 2b and 2c) that is operable by a user of the vehicle seat 1 is arranged on the vehicle seat 1, which lever is connected to the locking bolt 15c by means of the Bowden cable element 15d.

If the user pivots or displaces the lever 15e in a first direction (in the present case, forwards in the seat longitudinal direction 1x), a core 15f of the Bowden cable element 15d, which is formed in particular as a wire cable, is subjected to tensile stress, and the locking bolt 15c slides out of a bore 18 on the carriage element 12. Subsequently, the displacement of the carriage element 12 relative to the guide rail element 11 can take place.

If the user pivots or displaces the lever 15e in a second direction (in the present case, towards the rear in the seat longitudinal direction 1x), the core 15f is subjected to compressive stress, and the locking bolt 15c can slide into another bore 18 on the carriage element 12. In the present case, an adjustment element (not shown) in the form of a set screw is arranged on the lever 15e, by means of which adjustment element a preload of the core 15f can be changed.

In addition, it would be conceivable for the locking bolt 15c to be spring-loaded relative to the outer sleeve 15b, a force of a spring (not shown) of the spring mounting that is for example mounted in the cavity 15g between the outer face of the locking bolt 15c and the inner face of the outer sleeve 15b acting on the locking bolt 15c in the direction of the carriage element 12.

An outer sheath 15h of the Bowden cable element 15d, inside which the core 15f of the Bowden cable element 15d is displaceably mounted, is advantageously fastened to the seat substructure 2b, for example by means of a retaining plate 19a and a clamping screw 19b, such that the position of the outer sheath 15h relative to the seat substructure 2b is fixed.

Figure 7:
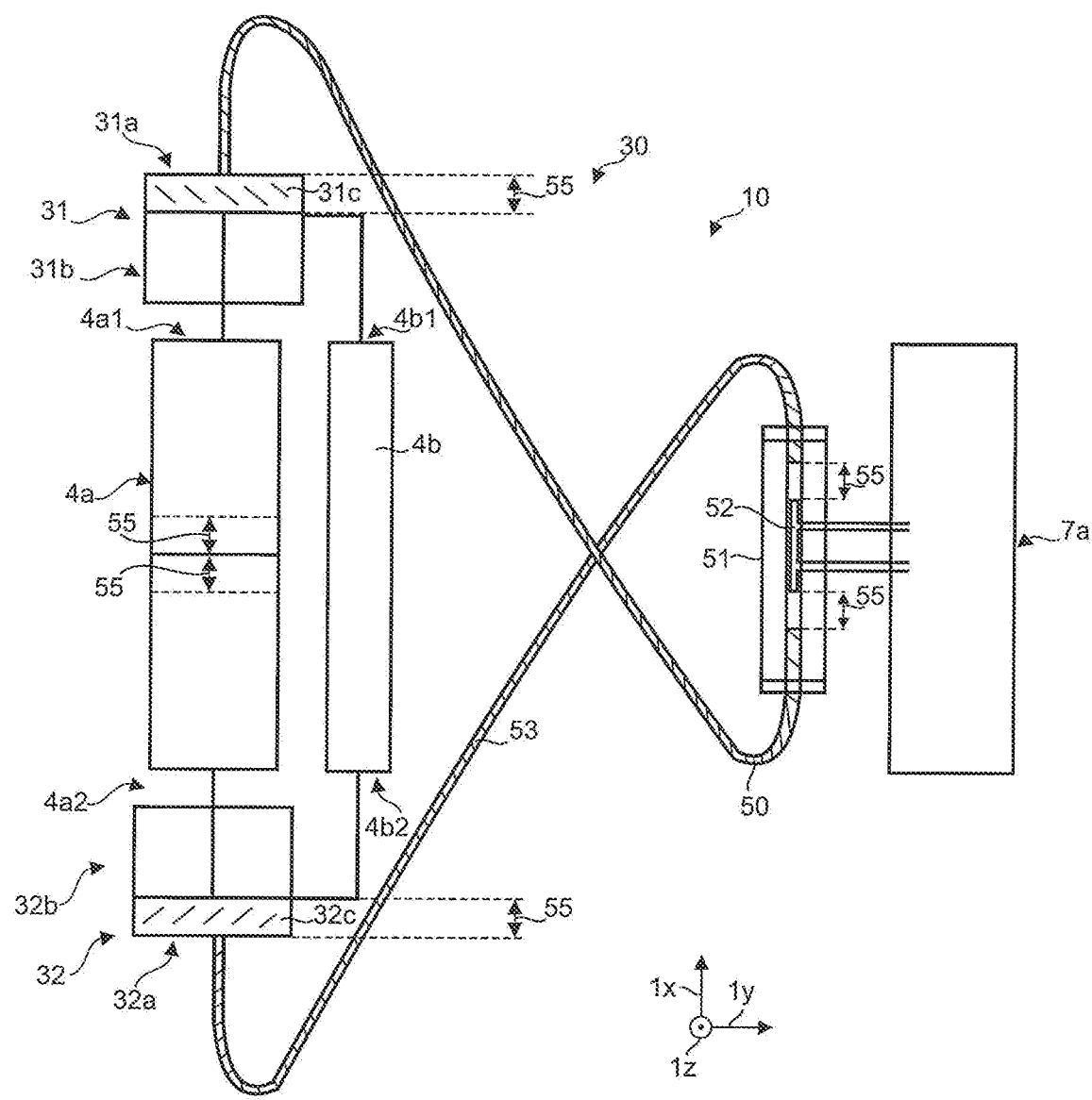
FIG. 7 schematically shows a pneumatic or hydraulic solution for the transmission system.

FIG. 7 shows a second embodiment of the transmission system, according to which the transmission system 10 is hydraulic and forms a cylinder system 30, the first portion 4a, 7a of the first 4 and of the second switching console element 7 each being connected to the cylinder system 30.

It can be seen that the cylinder system 30 comprises a first cylinder element 31 which is directly connected to the front end 4a1 of the first portion 4a of the first switching console element 4 and is connected to the first portion 7a of the second switching console element 7 by means of a conducting element 50, and comprises a second cylinder element 32 which is directly connected to the rear end 4a2 of the first portion of the switching console element 4 and is connected to the first portion of the second switching console element 7 by means of conducting elements 50 in each case. The connections of the cylinder elements 31, 32 thus cross over, as in the case of the Bowden cable elements 21, 22.

It can furthermore be seen that the second portion 4b, 7b of the first 4 and of the second switching console element 7 each comprise a front 4b1, 7b1 and a rear end 4b2, 7b2, the cylinder elements 31, 32 each comprising a stationary housing 31a, 32a and a piston rod assembly 31b, 32b which is movable relative to the housing 31a, 32a. In this case, the piston rod assemblies 31b, 32b comprise a piston rod and a piston. Furthermore, piston chambers 31c, 32c are shown, which are used for receiving a medium 53.

The housing 31a is connected to the front end 4b1 of the second portion 4b of the first switching console element 4. The housing 32a is connected to the rear end 4b2 of the second portion 4b of the first switching console element 4.

The piston rod assembly 31b is directly connected to the front end 4a1 of the first portion 4a of the first switching console element 4. The piston rod assembly 32b is directly connected to the rear end 4a2 of the first portion 4a of the first switching console element 4.

At the same time, a closed circuit is formed with respect to the medium 53 used (in this case, a hydraulic medium such as oil), which closed circuit, in the present case, comprises two medium-conducting portions that are separated by the carriage 52. The medium 53 is received and transported in the conducting element 50. A carriage 52 is arranged inside the conducting element 50 so as to be displaceable and so as to be sealed off with respect to the medium 53, to which carriage the first portion 7a of the second switching console element 7 is rigidly fastened. A sleeve 51 can be arranged, as shown, in order to guide the conducting element 50 in the longitudinal direction 1x, at least in portions. At the same time, it is conceivable for recesses to be arranged inside an outer sheath of the conducting element 50, through which recesses the mounting means are guided from the carriage 52 to the first portion 7a.

A change in the position of the first switching console element 4, in this case in the form of a displacement of the first switching console element 4 forwards by a distance 55 in the longitudinal direction 1x of the vehicle seat 1, also displaces the piston rod assembly 31b forwards in the longitudinal direction 1x of the vehicle seat 1. As a result, the medium 53 is pushed out of the piston chamber 31c and into the conducting element 50. Since the medium 53 is incompressible, the pressure is passed along the conducting element 50 and reaches the carriage 52 which is also displaced forwards, by the same distance 55, in the longitudinal direction 1x of the vehicle seat 1, together with the first portion 7a of the second switching console element, as a result of the cross-over connection. The maximum possible value of the distance 55 is preferably equal to or smaller than a maximum travel of one or both cylinder elements 31, 32.

All the features disclosed in the application documents are claimed as essential to the invention, provided that they are novel over the prior art, either individually or in combination.

LIST OF REFERENCE SIGNS 1 vehicle seat
1x longitudinal direction
1y width direction
1z height direction
2 seat part
2a seat surface
2b seat part frame
3 backrest part
4, 7 switching console element
4a, 7a first portion
4a1, 7a1 front end
4a2, 7a2 rear end
4b second portion
5 control element
6 actuator element
8a shaft
8a1 central axis
9 housing element
10 transmission system
11 guide rail element
11a, 11b end
12 carriage element
13 spacer bolts
13a, 13b end
14 stop element
15' securing element
15 locking bolt element
15a central axis
15b sleeve element
15c locking bolt
15d, 21, 22, 23 Bowden cable element
15e lever
15f, 21f, 22f, 23f core
15g cavity
15h, 21h, 22h, 23h sheath
16 retainer
17 control lever carrier
18 bore
19a retaining plate
19b clamping screw
20 Bowden cable system
30 cylinder system
31, 32 cylinder
31a, 32a housing
31b, 32b piston rod assembly
31c, 32c piston chamber
41, 42 part
43 pin
44 plate
45 set screw
46 clamping screw
50 conducting element
51 sleeve
52 carriage
53 medium
55 distance
60 armrest
E1 reference plane
L, R side
V vehicle

What is claimed is:

1. A vehicle seat for a vehicle, comprising:
a seat part that has a seat part frame;
a backrest part;
a first switching console element; and
a second switching console element, wherein each of the first and second switching console elements includes at least one control element for actuating at least one function of an actuator element of the vehicle, wherein the first switching console element is arranged on a first side of the seat part and the second switching console element is arranged on a second side of the seat part so as to extend in a longitudinal direction of the vehicle seat, wherein at least one of the seat part or the backrest part is designed so as to be adjustable with respect to a degree of inclination, wherein a change in a relative position of a first portion of the first switching console element with respect to the vehicle seat is transferred into a change in a relative position of a first portion of the second switching console element with respect to the vehicle seat by a transmission system that is free of electronic components, wherein the transmission system is exclusively mechanical and forms a Bowden cable system, and wherein the first portions of the first and of the second switching console elements each comprises a front end and a rear end, at least two of the ends are directly connected to the Bowden cable system.

2. The vehicle seat according to claim 1, wherein the change in the relative position of the first portion of the first switching console element, with respect to the vehicle seat, is made in the longitudinal direction.

3. The vehicle seat according to claim 1, wherein the change in the relative position of the first portion of the first switching console element is carried out synchronously with the change in the relative position of the first portion of the second switching console element.

4. The vehicle seat according to claim 1, wherein the first and the second switching console elements each comprises a second portion that is directly and rigidly connected to the seat part frame, and wherein, relative to the second portion, the first portion is in each case designed to be displaceable, at least in the longitudinal direction of the vehicle seat, in order to bring about the change in the relative position of the first portions.

5. The vehicle seat according to claim 4, wherein the second portions of the first and of the second switching console elements each comprises a front end and a rear end, and wherein the Bowden cable elements each comprises a stationary sheath that is connected to two of the front and rear ends of the second portions of the first and of the second switching console elements in each case, and the Bowden cable elements each comprising a movable core that is connected to two of the front and rear ends of the first portions of the first and of the second switching console elements in each case.

6. The vehicle seat according to claim 1, wherein the Bowden cable system comprises a first Bowden cable element that is directly connected to the front end of the first portion of the first switching console element and to the rear end of the first portion of the second switching console element, and a second Bowden cable element that is directly connected to the front end of the first portion of the second switching console element and to the rear end of the first portion of the first switching console element in each case.

7. The vehicle seat according to claim 1, wherein the Bowden cable system comprises a single Bowden cable element that is subjected to tensile and compressive stress and that is directly connected to one of the front ends and directly connected to one of the rear ends of the first portions of the switching console elements.

8. The vehicle seat according to claim 1, wherein the change in the relative position of the first portion of the first switching console element is carried out synchronously with the change in the relative position of the first portion of the second switching console element, such that the relative position of the first portion of the first switching console element is mirror-symmetrical to the relative position of the first portion of the second switching console element, with respect to the vehicle seat, in relation to a reference plane that extends in the longitudinal direction and a height direction of the vehicle seat.

9. A vehicle seat for a vehicle, comprising:
a seat part that has a seat part frame;
a backrest part;
a first switching console element; and
a second switching console element, wherein each of the first and second switching console elements includes at least one control element for actuating at least one function of an actuator element of the vehicle, wherein the first switching console element is arranged on a first side of the seat part and the second switching console element is arranged on a second side of the seat part so as to extend in a longitudinal direction of the vehicle seat, wherein at least one of the seat part or the backrest part are designed so as to be adjustable with respect to a degree of inclination, wherein a change in a relative position of a first portion of the first switching console element with respect to the vehicle seat is transferred into a change of a relative position of a first portion of the second switching console element with respect to the vehicle seat by a transmission system that is free of electronic components, and wherein the transmission system is at least one of pneumatic or hydraulic at least in part and forms a cylinder system, the first portion of the first and of the second switching console elements each being connected to the cylinder system.

10. The vehicle seat according to claim 9, wherein the cylinder system comprises a first cylinder element that is directly connected to the front end of the first switching console element and that is connected to the rear end of the second switching console element by at least one conducting element, and comprises a second cylinder element that is directly connected to the rear end of the first switching console element and that is connected to the front end of the second switching console element by the at least one conducting element.

11. The vehicle seat according to claim 10, wherein the second portions of the first and of the second switching console elements each comprises a front and a rear end, the cylinder elements each comprising a stationary housing and a piston rod assembly that is movable relative to the housing, and wherein the stationary housing is connected to one of the front or rear ends of the second portions of the first switching console element or of the second switching console element in each case, and the piston rod assemblies being directly connected to one of the front or rear ends of the first portions of the first switching console element or of the second switching console element in each case.

12. The vehicle seat according to claim 9, wherein the change in the relative position of the first portion of the switching console element is carried out synchronously with the change in the relative position of the first portion of the second switching control element.

13. The vehicle seat according to claim 9, wherein the change in the relative position of the first portion of the first switching console element is carried out synchronously with the change in the relative position of the first portion of the second switching console element, such that the relative position of the first portion of the first switching console element is mirror-symmetrical to the relative position of the first portion of the second switching console element, with respect to the vehicle seat, in relation to a reference plane that extends in the longitudinal direction and a height direction of the vehicle seat.

* * * * *